(12) United States Patent
Chen et al.

(10) Patent No.: US 8,760,676 B2
(45) Date of Patent: Jun. 24, 2014

(54) FEED AND SCAN MODULE AND MULTIFUNCTIONAL PRINTER USING THE SAME

(71) Applicants: Kinpo Electronics, Inc., New Taipei (TW); Cal-Comp Electronics & Communications Company Limited, New Taipei (TW)

(72) Inventors: Chao-Ming Chen, New Taipei (TW); Chia-Wu Liao, New Taipei (TW)

(73) Assignees: Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 13/778,119

(22) Filed: Feb. 27, 2013

(65) Prior Publication Data

US 2014/0132971 A1    May 15, 2014

(30) Foreign Application Priority Data

Nov. 9, 2012    (TW) .............................. 101141878 A

(51) Int. Cl.
*G06F 15/00*    (2006.01)
*G06F 3/12*    (2006.01)
*G06K 1/00*    (2006.01)

(52) U.S. Cl.
USPC .......................................... 358/1.13; 358/1.1

(58) Field of Classification Search
USPC ................................ 358/1.13, 1.14, 1.15, 1.1
See application file for complete search history.

(56) References Cited

U.S. PATENT DOCUMENTS

| | | | |
|---|---|---|---|
| 3,027,285 A * | 3/1962 | Eisner et al. .................. | 156/359 |
| 6,151,140 A | 11/2000 | Wilcox et al. | |
| 6,698,639 B1 * | 3/2004 | Otomo et al. ................ | 226/97.4 |
| 7,497,657 B2 * | 3/2009 | Wang .............................. | 415/71 |

* cited by examiner

*Primary Examiner* — Douglas Tran
(74) *Attorney, Agent, or Firm* — Jianq Chyun IP Office

(57) ABSTRACT

A feed and scan module and a multifunctional printer (MFP) using the same are provided. The MFP includes a body with a paper-feeding path therein and a feed and scan module, the feed and scan module is disposed in the body and adjacent to an entrance of the feeding path. The feed and scan module includes a feeding roller chain and an image processing component, the feeding roller chain includes a driving unit and a transparent hollow driving tube assembled with the driving unit. The image processing component is in bar-shape and disposed in the hollow driving tube, and the image processing component is fixed and faces the paper-feeding path. When the hollow driving tube rotates, the image processing component is not driven by the hollow driving tube.

10 Claims, 4 Drawing Sheets

FEED AND SCAN MODULE AND MULTIFUNCTIONAL PRINTER USING THE SAME

CROSS-REFERENCE TO RELATED APPLICATION

This application claims the priority benefit of Taiwan application serial no. 101141878, filed on Nov. 9, 2012. The entirety of the above-mentioned patent application is hereby incorporated by reference herein and made a part of this specification.

BACKGROUND

1. Field of the Disclosure

The disclosure generally relates to a feed and scan module and a multifunctional printer (MFP) using the same, and more particularly, to a feed and scan module where the image processing component and the paper-feeding roller are integrated and an MFP using the same.

2. Description of Related Art

FIG. 1 is a schematic diagram of a conventional MFP. Referring to FIG. 1, in the conventional MFP 100, an independent image processing module 110 is disposed therein, and the image processing module 110 has an independent paper-feeding path, an independent inlet tray and an independent outlet tray.

In more details, the paper-picking roller 120 is disposed in the body 100a of the MFP 100 and located at the entrance of the inlet tray, and thereafter, other rollers 130, 140 and 150 disposed along the paper-feeding path P drive the paper conveying in the paper-feeding path P.

It should be noted that the image processing module 110 is also disposed in the paper-feeding path P, and the image processing module 110 and the rollers 120, 130, 140, and 150 disposed along the paper-feeding path P are independently from each other. Therefore, such a layout requires a sufficient space in the body 100a of the MFP 100 to accommodate the individual and independent rollers 120, 130, 140, 150 and the image processing module 110 therein, which will affect the overall volume of the MFP 100.

SUMMARY OF THE DISCLOSURE

Accordingly, the disclosure is directed to a feed and scan module where the image processing component and the paper-feeding roller are integrated.

The disclosure is also directed to an MFP using the above-mentioned feed and scan module, which can effectively reduce the volume of the MFP.

The disclosure provides a feed and scan module, which includes a feeding roller chain and an image processing component, in which the feeding roller chain includes a driving unit and a hollow driving tube assembled with the driving unit and the hollow driving tube is transparent; the image processing component is in bar-shape and disposed in the hollow driving tube, and the image processing component faces a fixing direction and is not driven by the hollow driving tube in rotating state.

The disclosure also provides an MFP, which includes a body and a feed and scan module, the body has a paper-feeding path and the feed and scan module is disposed in the body and adjacent to an entrance of the feeding path. The feed and scan module includes a feeding roller chain and an image processing component, in which the feeding roller chain includes a driving unit and a hollow driving tube assembled with the driving unit and the hollow driving tube is transparent. The image processing component is in bar-shape and disposed in the hollow driving tube, and the image processing component is fixed and faces the feeding path. When the hollow driving tube rotates, the image processing component is not driven by the hollow driving tube.

Based on the description above, in the feed and scan module of the disclosure, the image processing component and the feeding roller chain are integrated together, therefore, when the feed and scan module is used in an MFP, the number of elements disposed in the MFP can be reduced and further the volume of the MFP is reduced as well.

In order to make the features and advantages of the present disclosure more comprehensible, the present disclosure is further described in detail in the following with reference to the embodiments and the accompanying drawings.

BRIEF DESCRIPTION OF THE DRAWINGS

FIG. 6-1 is a schematic diagram showing a fixing way between the end of a hollow driving tube and a fixing rib.

FIGS. 6-2 and 6-3 are two schematic diagrams showing another fixing way respectively between one of the two ends of a hollow driving tube and a fixing rib.

DESCRIPTION OF THE EMBODIMENTS

In the prior art, the scan module and the rollers disposed along the paper-feeding path are independently from each other, and these individually and independently rollers and scan module occupy a quite large space in an MFP, which affects the overall volume of the MFP. On the contrary, in the feed and scan module provided by the disclosure, the feeding roller chain and the image processing component are integrated together, so that during driving the paper by the rollers for conveying and passing through the hollow driving tube, the image processing on the paper is simultaneously performed. In addition, the design of integrating the feeding roller chain and the image processing component into a feed and scan module and using the feed and scan module in an MFP can further reduce the space inside the MFP originally occupied by individually disposed feeding roller chain and the image processing component and further effectively reduce the overall volume of the MFP.

The relevant technical principles and the features and effects thereof are clearly depicted together with the accompanying drawings in the following depicted embodiments, which are used in examples only, not to limit the disclosure. Note that some of expression words for the relative positions of the parts hereinafter such as 'front', 'behind', 'above', 'under', 'left', 'right', and the like, and the directions of X, Y and Z are to describe and, not to limit, the disclosure.

Figure 2:
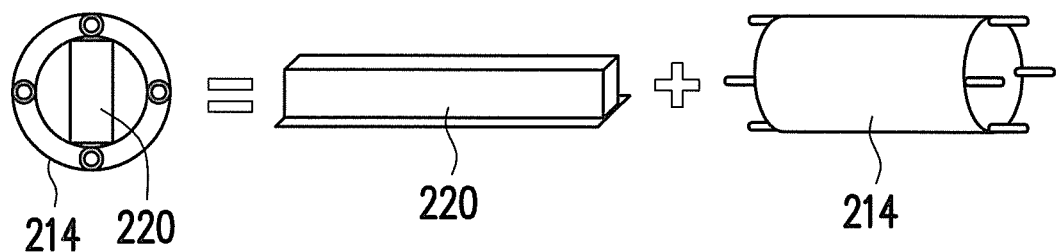
FIG. 2 is an exploded diagram of a hollow driving tube and an image processing component in a feed and scan module according to an embodiment of the invention.
Figure 3:
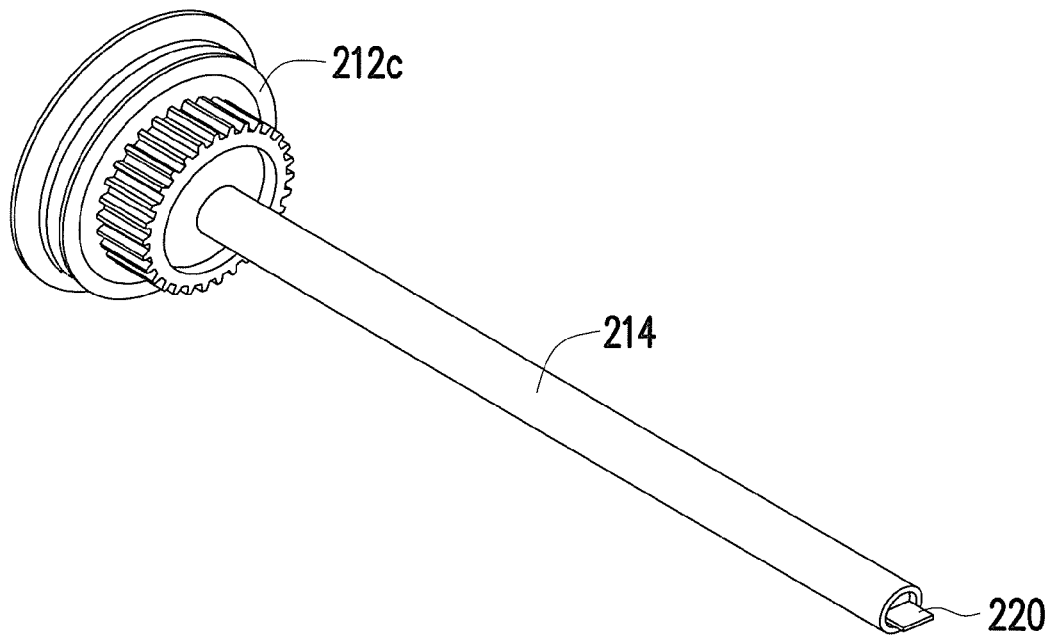
FIG. 3 is a three-dimensional diagram of the feed module of FIG. 2 after assembling.
Figure 4:
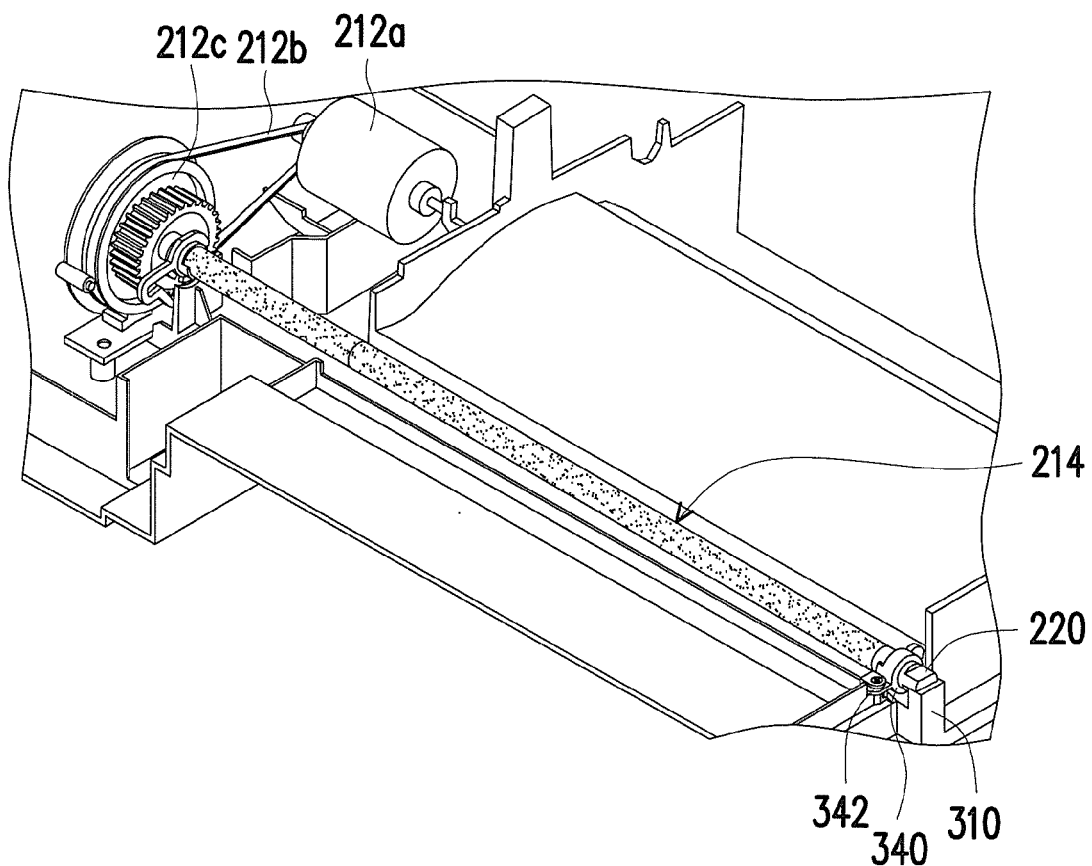
FIG. 4 is a three-dimensional diagram showing the feed and scan module of FIG. 3 used in an MFP.

FIG. 2 is an exploded diagram of a hollow driving tube and an image processing component in a feed and scan module according to an embodiment of the invention, FIG. 3 is a three-dimensional diagram of the feed module of FIG. 2 after assembling and FIG. 4 is a three-dimensional diagram showing the feed and scan module of FIG. 3 used in a MFP. Referring to FIGS. 2, 3 and 4, a feed and scan module 200 includes a feeding roller chain 210 and an image processing component 220, in which the feeding roller chain 210 includes a driving unit 212 and a hollow driving tube 214 assembled with the driving unit 212 together and the hollow driving tube 214 is transparent. The image processing component 220 is in bar-shape and disposed in the hollow driving tube 214. The image processing component 220 faces a fixing direction and is not driven by the hollow driving tube 214 in rotating state.

In addition, the driving unit 212 includes a motor 212a, a belt 212b and a gear 212c. The belt 212b is pulled on the motor 212a and the gear 212c so that when the motor 212a runs, the belt 212b is driven by the motor 212a and drives the gear 212c to rotate, and the hollow driving tube 214 and the gear 212c are coaxially assembled together.

Figure 5:
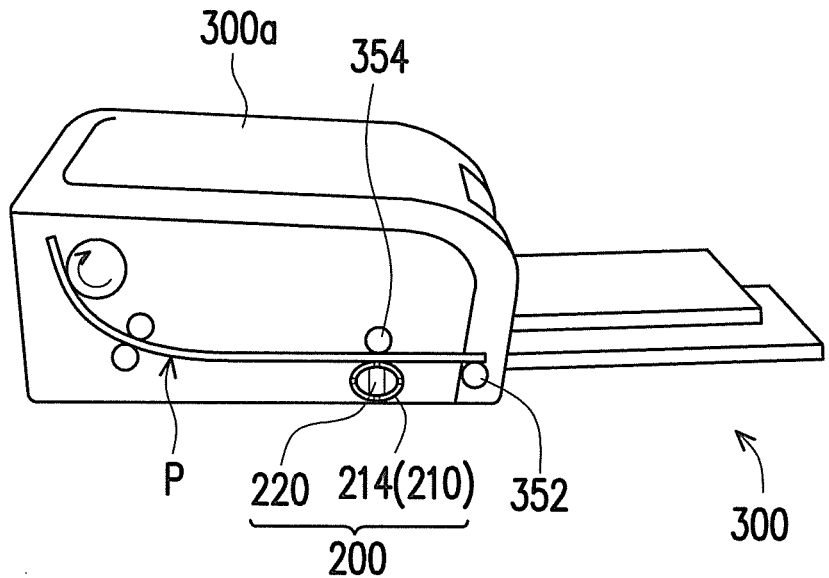
FIG. 5 is a three-dimensional diagram showing the layout of partial components of the MFP in FIG. 4.

FIG. 5 is a three-dimensional diagram showing the layout of partial components of the MFP in FIG. 4. Referring to FIGS. 4 and 5, when the feed and scan module 200 is applied in an MFP 300, the feed and scan module 200 is installed in the body 300a of the MFP 300, in which the body 300a has a paper-feeding path P therein, the feed and scan module 200 is adjacent to an entrance of the feeding path P in the body 300a, and the image processing component 220 of the feed and scan module 200 is fixed to face the paper-feeding path P to perform scanning on the paper conveying in the paper-feeding path P.

A plurality of fixing ribs 310 are disposed in the body 300a, in which the fixing ribs 310 are located beside two ends of the image processing component 220, so that the two ends of the image processing component 220 stretching out of the hollow driving tube 214 can be fixed on the fixing ribs 310, which avoids the affecting of the rotation of the hollow driving tube 214.

In the embodiment, the ends of the hollow driving tube 214 respectively have a first assembly structure 214a, in which the first assembly structure 214a is one of opening or tenon, while each of the fixing ribs 310 has a second assembly structure 310a and the second assembly structure 310a is another one of the opening or the tenon. By locking between the tenon and the opening, the first assembly structure 214a and the second assembly structure 310a are assembled together, as shown by FIG. 6-1, the first assembly structure 214a is an opening and the second assembly structure 310a is a tenon going through the opening.

Figure 1:
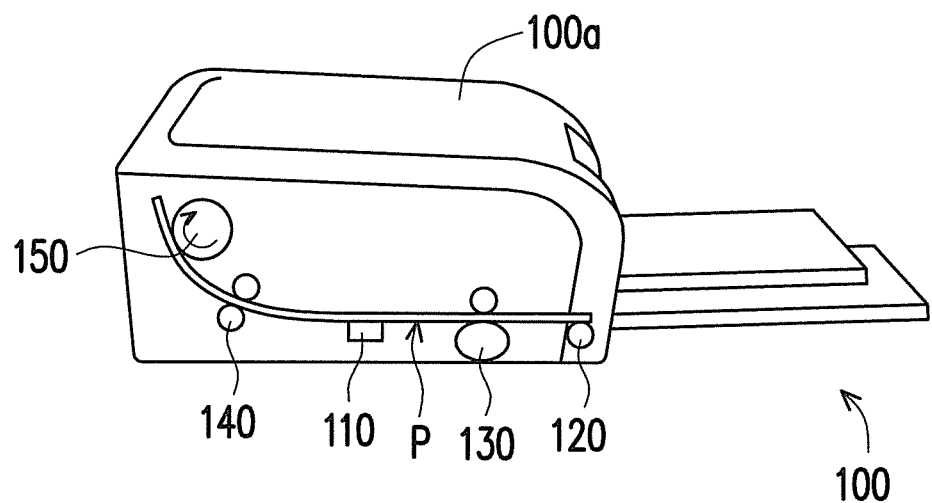
FIG. 1 is a schematic diagram of a conventional MFP.
Figures 1, 6:
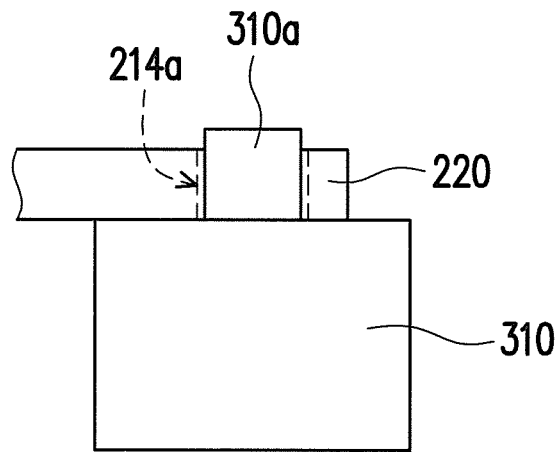
Figures 2, 6:
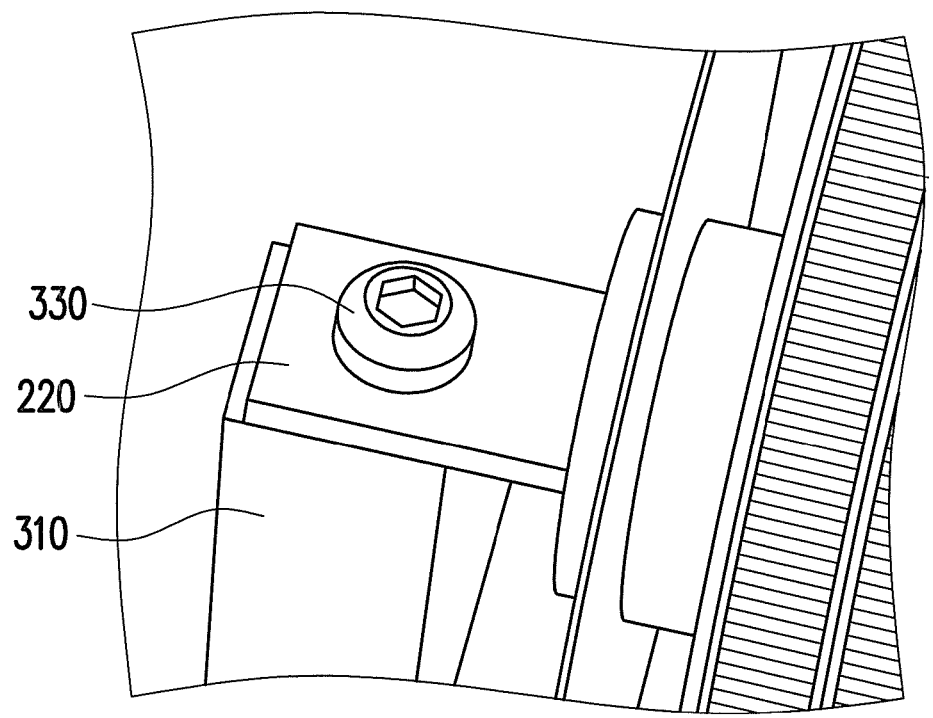
Figures 3, 6:
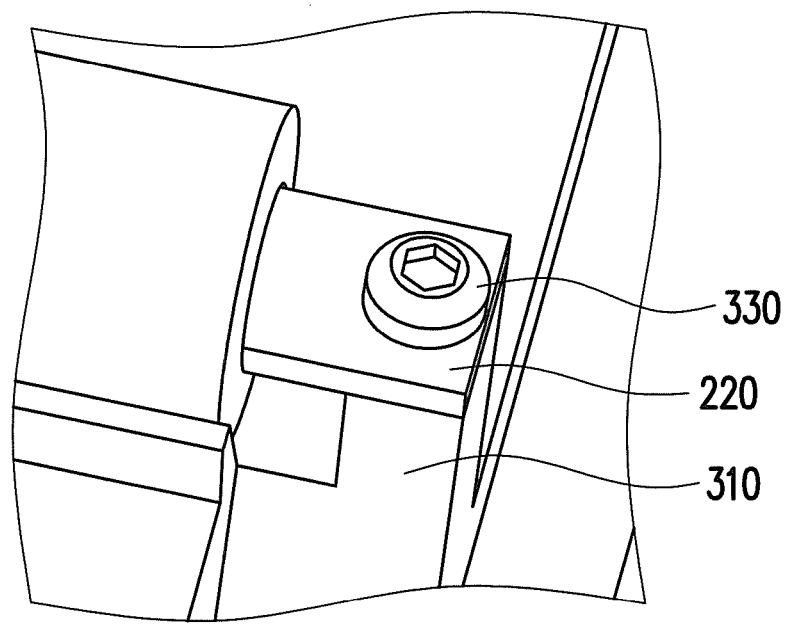

In another embodiment, the fixing way between the end and the fixing rib 310 is different from the implementation in FIG. 6-1. In more details, the MFP 300 further includes a plurality of assembling components 330, and both ends of the image processing component 220 stretching out of the hollow driving tube 214 are first assembly structures 214a serve as openings (as shown by FIG. 6-1), while the assembling components 330 go through the openings and are fixed at the fixing ribs 310 (as shown by FIGS. 6-2 and 6-3). In FIGS. 6-2 and 6-3, the assembling components 330 are screws, which the disclosure is not limited to. In fact, the assembling components 330 can be tenon or other components able to go through the openings and fix the ends of the image processing component 220.

The MFP 300 further includes fixing components 340, which are roughly in ring-shape. Two positioning flange 342 are disposed on two sides of a same radial direction of each of the fixing components 340. The ends of the image processing component 220 plug into the fixing components 340 in ring-shape and the positioning flange 342 are fixed at the fixing ribs 310. The fixing way between the positioning flange 342 and the fixing ribs 310 are similar to the fixing way between the ends and the fixing ribs 310, where a fitting between the tenon and the opening or a fitting between the screw and the opening is used depending on the requirement.

It should be noted that the feeding roller chain 210 of the feed and scan module 200 in the embodiment further includes a plurality of transmission gears in engagement by each other. Since the transmission gears in engagement by each other do not belong to the technical feature of the disclosure, for simplicity, they are omitted in the embodiment and not shown in the figure. However, the readers should know that the feed and scan module 200 and the MFP 300 using the feed and scan module 200 of the embodiment include these gears not disclosed herein.

Referring to FIGS. 4 and 5, when the MFP 300 is used to scan and print, the motor 212a of the driving unit 212 runs and drives the gear 212c to rotate through the belt 212b and further to drive the other rollers to rotate thus as well, in which the roller 352 located at the entrance of the feeding path P rotates and drives the paper in the paper tray entering the paper-feeding path P; then, the paper is driven by the paper-feeding roller 354 in the feeding roller chain 210 of the feed and scan module 200 located adjacently to the entrance of the feeding path P to be continuously conveyed in the paper-feeding path P.

Especially, along with the rotation of the gear 212c, the hollow driving tube 214 is also driven to rotate. At the time, the image processing component 220 disposed in the hollow driving tube 214 is fixed in the direction facing the paper-feeding path P. Thus, during the rotation of the hollow driving tube, the image processing component 220 simultaneously scans the paper passing through the hollow driving tube and sends back the obtained image signal to a central processing unit (CPU) for image processing, and the scanned image can be stored or printed.

It should be noted that, the layout of the parts in the image processing component 220 of the embodiment and the actions are well known by the people skilled in the art, which is omitted to describe.

The influence of the roller located at the back end of the paper-feeding path P on the paper does not belong to the technical feature of the disclosure and should be known by the people skilled in the art, which is omitted to describe.

In summary, in the feed and scan module of the disclosure and the MFP using the feed and scan module, since the feeding roller chain and the image processing component are integrated together, therefore, during performing the scanning procedure, when the roller drives the paper for conveying and the paper pass through the hollow driving tube, the image processing component can perform image processing on the paper simultaneously.

In comparison with the conventional scan module, where the scan module and the rollers located along the paper-feeding path are independently disposed from each other, the feed and scan module of the disclosure can save the component disposed along the paper-feeding path, and the internal space in the MFP originally required by the independent layout of the feeding roller chain and the image processing component is reduced and further the overall volume of the MFP is reduced as well.

It will be apparent to those skilled in the art that the descriptions above are several preferred embodiments of the disclosure only, which does not limit the implementing range of the disclosure. Various modifications and variations can be made to the structure of the disclosure without departing from the scope or spirit of the disclosure. The claim scope of the disclosure is defined by the claims hereinafter.

What is claimed is:

1. A feed and scan module, comprising:
  a feeding roller chain, comprising a driving unit and a hollow driving tube, wherein the hollow driving tube and the driving unit are assembled together and the hollow driving tube is transparent; and
  an image processing component, which is in bar-shape and disposed in the hollow driving tube, and the image processing component faces a fixing direction and not driven by the hollow driving tube in rotating state.

2. The feed and scan module claimed in claim 1, wherein the driving unit comprises:
  a motor and a belt; and
  a gear, wherein the belt is pulled on the motor and the gear so that when the motor runs, the belt is driven and drives the gear to rotate, and the hollow driving tube and the gear are coaxially assembled together.

3. A multifunctional printer, comprising:
  a body, having a paper-feeding path therein;
  a feed and scan module, disposed in the body and adjacent to an entrance of the feeding path and comprising:
    a feeding roller chain, comprising a driving unit and a hollow driving tube, wherein the hollow driving tube and the driving unit are assembled together and the hollow driving tube is transparent; and
    an image processing component, in bar-shape and disposed in the hollow driving tube, wherein the image processing component is fixed and faces the paper-feeding path, and when the hollow driving tube rotates, the image processing component is not driven by the hollow driving tube.

4. The multifunctional printer claimed in claim 3, wherein the driving unit comprises:
  a motor and a belt; and
  a gear, wherein the belt is pulled on the motor and the gear so that when the motor runs, the belt is driven and drives the gear to rotate, and the hollow driving tube and the gear are coaxially assembled together.

5. The multifunctional printer claimed in claim 3, wherein the body comprises a plurality fixing ribs disposed at two ends of the image processing component, and the ends of the image processing component further stretches out from the hollow driving tube to be fixed on the fixing ribs.

6. The multifunctional printer claimed in claim 5, wherein each of the ends has a first assembly structure and each of the fixing ribs has a second assembly structure, and the first assembly structure and the second assembly structure are assembled together.

7. The multifunctional printer claimed in claim 6, wherein the first assembly structure is one of opening or tenon and the second assembly structure is the other one of the opening or the tenon.

8. The multifunctional printer claimed in claim 6, further comprising two assembling components, wherein the image processing component stretches out from the ends of the hollow driving tube and has two openings, and the assembling components go through the openings and are fixed at the fixing ribs.

9. The multifunctional printer claimed in claim 8, wherein the assembling components are screw or tenon.

10. The multifunctional printer claimed in claim 5, further comprising two fixing components fixed at the fixing ribs, and the ends of the image processing component plug into the fixing components.

* * * * *